2,696,477
Patented Dec. 7, 1954

2,696,477

ACROLEIN-FORMALDEHYDE CONDENSATION PRODUCT

Dmitry M. Gagarine and Henry Repokis, Danville, Va., assignors to Dan River Mills, Incorporated, a corporation of Virginia No Drawing. Application April 21, 1951, Serial No. 222,297

9 Claims. (Cl. 260—29.2)

This invention relates to aldehyde condensation products suitable for treating textile fabrics, and more particularly to an acrolein-formaldehyde condensation product that is condensed in a basic medium and is completely soluble in water. It may be applied, in aqueous solution, to cloth for imparting crease-resistance as disclosed in our application Serial No. 286,038 filed May 3, 1952.

Pursuant to the present invention, the condensation product is produced by reacting one mol of acrolein with one to six mols, preferably four mols, of formaldehyde, in the presence of a basic catalyst. Examples of suitable catalysts are sodium carbonate, and sodium, potassium, calcium, or barium hydroxide. The condensation reaction may be carried out in two steps wherein part of the formaldehyde is mixed with the acrolein and another part mixed with the catalyst, and these two mixtures then brought together carefully and reacted. The purpose of this procedure is to control the highly exothermic reaction that takes place when the acrolein and formaldehyde are activated by the basic catalyst. Also, by slowly introducing the formaldehyde-acrolein mixture into the formaldehyde-basic catalyst mixture below the surface of the latter, the escape of acrolein fumes is prevented.

As a further control for the very exothermic reaction between the formaldehyde and acrolein, the reaction mixture may be kept cool by suitable means, such as cooling coils in the reaction vessel. A desirable temperature to maintain is about 50° C. to 65° C. This temperature range has been found to give the best condensation results, while also preventing the liberation of acrolein fumes.

The acrolein-formaldehyde condensation product may be prepared either under pressurized or reflux conditions. Under pressurized conditions, the formaldehyde and acrolein are placed in a strong container which is then sealed. Because of the highly exothermic reaction which takes place between the acrolein and the formaldehyde in the presence of the basic catalyst, the latter is introduced into the container in a glass tube and the catalyst liberated into the reaction mixture by inverting or breaking the glass tube. The reaction is over when the heat dissipates. Under reflux conditions, the reaction may be carried out easily in a three-neck flask containing the formaldehyde and acrolein and to which is added the alkaline catalyst by a gradual addition until no further reaction occurs on addition of the basic catalyst.

Typical but non-limiting examples of the condensation constituents and their proportions, are given below.

EXAMPLE I

| Constituents | Amounts, lbs. | Mol Ratios |
|---|---|---|
| Acrolein | 56 | 1 |
| Formaldehyde (Formalin)—37.5% | 325 | 4 |
| Sodium Carbonate | 1-8 | ¼%-2% |

EXAMPLE II

| Constituents | Amounts, lbs. | Mol Ratios |
|---|---|---|
| Acrolein | 56 | 1 |
| Formaldehyde (Formalin)—37.5% | 128 | 1.57 |
| Paraformaldehyde | 73 | 2.43 |
| Sodium Carbonate | 4-8 | 1%-2% |

In the above two examples, utilizing four mols of formaldehyde to one mole of acrolein, the formaldehyde may be divided into two equal parts consisting of two mols each. One portion is added to the one mol of acrolein, which has been freshly distilled so as to have it present in unpolymerized, reactive state. This mixture of formaldehyde and acrolein is relatively stable and may be kept overnight at room temperature in the dark. To the other two mols of formaldehyde are added sufficient sodium carbonate to bring the pH of the mixture to about 9, and to this mixture is then added the acrolein-formaldehyde mixture. The total amount of sodium carbonate in a typical case is about 1% based on the total weight of the reaction products, and of this amount about one-half could be added at first to the formaldehyde-sodium carbonate mixture, and then the other half added to the complete reaction mixture.

After the exothermic reaction is completed, the reaction mixture may be neutralized with a suitable mineral acid, such as hydrochloric acid or sulfuric acid, and in sufficient amount to lower the pH of the mixture to about 2 to 2.5. The reaction mixture is now cooled to room temperature and is ready for use in treating textiles in accordance with the process disclosed and claimed in our aforesaid copending application.

The condensation product of this invention will soften upon reheating, like a thermoplastic resin, but in other respects it does not react or function as a resin. It is more nearly a chemical compound that is adapted to react with the cellulose of the textiles treated therewith.

The condensation product resulting from the formula given in Example I above has a residual odor of formaldehyde. Where it is desired to provide a product free of a formaldehyde odor, the constituents and proportions given in Example II above are utilized. In that case, the one mol of acrolein may be added to 0.67 mol of the Formalin. Then to the remaining 0.9 mol of Formalin are added the 2.43 mols of paraformaldehyde. This gives a smooth, stirrable paste, to which the sodium carbonate is added as above described. The acrolein-Formalin solution is introduced below the surface of this paste, and the mixture is cooled with cooling coils so as to maintain a temperature of about 50° C.-65° C. The paste dissolves slowly, and the final condensation product has no noticeable odor of formaldehyde or acrolein. This product is acidified to a pH of about 2 to 2.5 to prepare it for use in treating cloth. The dried product is a straw-colored liquid that solidifies when cooled and melts again when warmed.

Various modifications and changes may be made in the above-described materials and procedures without departing from the scope of our invention as defined in the appended claims.

We claim:

1. An aqueous solution of a condensation product consisting essentially of the reaction product of one mol of acrolein with one to six mols of formaldehyde and approximately ¼% to 5% by weight of sodium carbonate catalyst.

2. A process of producing a water-soluble condensation product suitable for treating textiles, comprising reacting one mol of acrolein with one to six mols of formaldehyde in the presence of from about ¼% to 5% by weight of a basic catalyst.

3. A process of producing a water-soluble condensation product suitable for treating textiles, comprising reacting one mol of acrolein with one to six mols of formaldehyde in the presence of from about ¼% to 5% of sodium carbonate sufficient to give the reaction mixture a pH value of greater than 7, and acidifying the reaction mixture to a pH of about 1 to 7.

4. A process of producing a water-soluble condensation product suitable for treating textiles, comprising mixing acrolein with formaldehyde, separately mixing an additional amount of formaldehyde with from about ¼% to 5% by weight a basic catalyst, and then carefully combining these two mixtures to permit an exothermic reaction to take place between the acrolein and formaldehyde under controlled conditions and until the reaction is complete.

5. A process of producing a water-soluble condensation product suitable for treating textiles, comprising mixing approximately two mols of formaldehyde with approximately 2% of sodium carbonate to produce a smooth paste thereof, separately mixing an additional two mols of formaldehyde with one mol of acrolein, and then gradually adding the acrolein-formaldehyde mixture to the formaldehyde-sodium carbonate paste under the surface thereof so as to avoid the escape of acrolein fumes and yet permit the exothermic reaction to take place between the acrolein and the formaldehyde until the reaction is complete, and finally acidifying the reaction mixture.

6. A process of producing a condensation product suitable for treating textiles, comprising mixing acrolein and formaldehyde in a strong sealed container, liberating in said container about ¼% to 5% by weight of sodium carbonate to activate the exothermic reaction between the acrolein and formaldehyde while keeping the container tightly sealed and the exothermic reaction mixture under pressure until the reaction is complete, and then acidifying the final reaction mixture.

7. A process of producing an aqueous solution of a condensation product suitable for treating textiles, comprising mixing approximately one mol of acrolein with approximately four mols of formaldehyde, in a reaction vessel provided with a reflux, and then slowly adding to this mixture a small percentage less than 5% by weight of a basic catalyst and at a rate adapted to maintain control of the exothermic reaction between the acrolein and formaldehyde, until the reaction is complete.

8. A water soluble condensation product suitable for the treatment of textile material comprising the reaction product of one mol of acrolein and one to six mols of formaldehyde in the presence of a small percentage less than 5% by weight of a basic catalyst.

9. A process of producing a water soluble condensation product suitable for treating textiles, comprising reacting one mol of acrolein with one to six mols of formaldehyde in the presence of a small percentage less than 5% by weight of a basic catalyst.

References Cited in the file of this patent

UNITED STATES PATENTS

| Number | Name | Date |
|---|---|---|
| 1,878,040 | Voss | Sept. 20, 1932 |
| 2,212,894 | Allen | Aug. 27, 1940 |
| 2,549,508 | Mottern | Apr. 17, 1951 |

FOREIGN PATENTS

| Number | Country | Date |
|---|---|---|
| 349,188 | Germany | Feb. 24, 1922 |
| 219,661 | Switzerland | June 1, 1942 |

OTHER REFERENCES

Friederich et al., Berichte, vol. 63, 1930, pp. 2681 and 2686.

Chemical Abstracts, vol. 24, 1930, pp. 5515, 5516, being an abstract of an article by Hanyu et al., in Researches Electro-tech. Lab., Tokyo, Japan, No. 287, 18 pp. (1930).